Jan. 31, 1961  D. BERLIN  2,969,988
SQUARE SHOPPING CART
Filed March 10, 1958  2 Sheets-Sheet 1
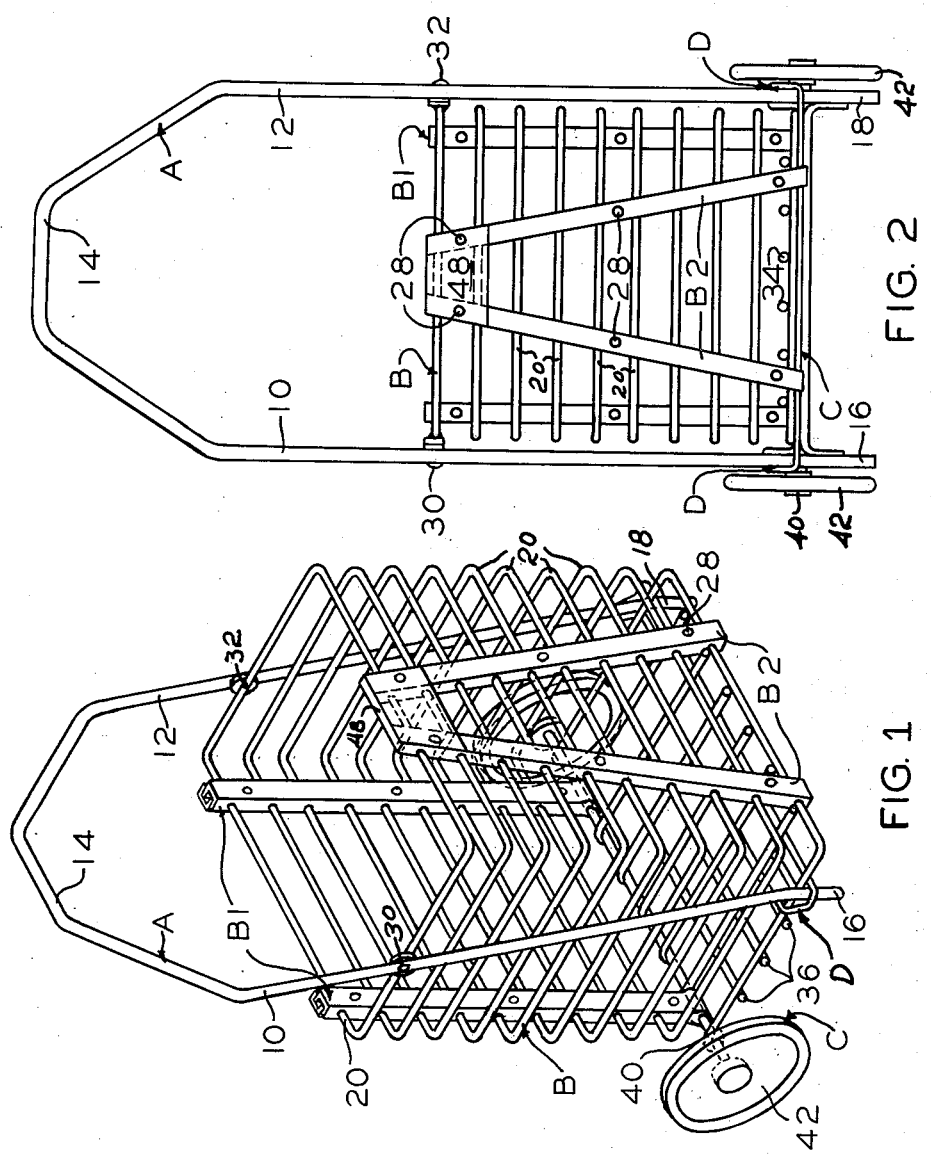
INVENTOR
DANIEL BERLIN
BY
ATTORNEYS Jan. 31, 1961 D. BERLIN 2,969,988
SQUARE SHOPPING CART
Filed March 10, 1958 2 Sheets-Sheet 2
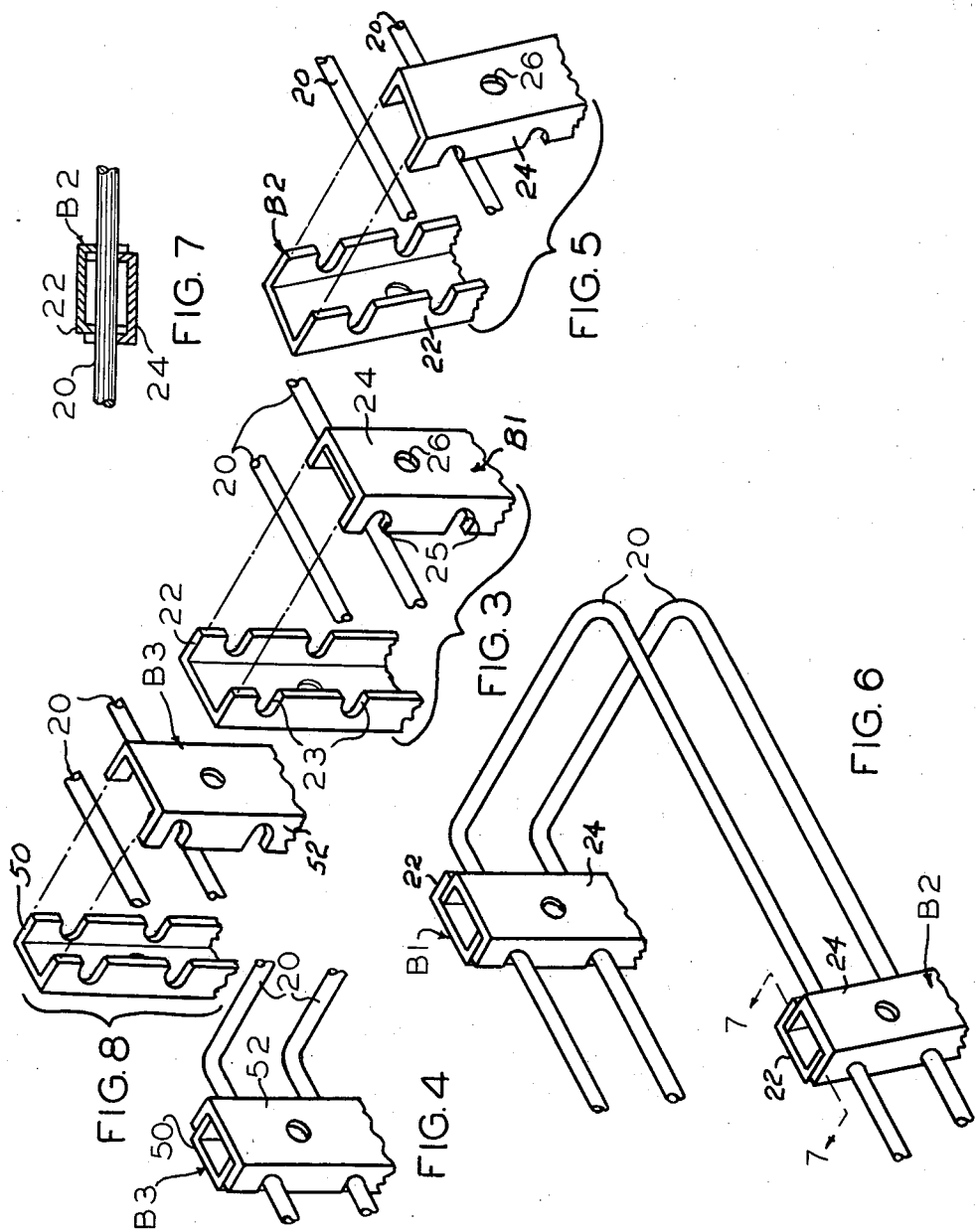
INVENTOR
DANIEL BERLIN
BY
ATTORNEYS

United States Patent Office 2,969,988
Patented Jan. 31, 1961

2,969,988

SQUARE SHOPPING CART

Daniel Berlin, 4424 Paul St., Philadelphia, Pa.

Filed Mar. 10, 1958, Ser. No. 720,448

4 Claims. (Cl. 280—36)

This application is a continuation-in-part of my application Serial No. 616,082, filed October 15, 1956.

My invention relates to a cart for carrying parcels of groceries, laundry, and other items, and more particularly relates to a portable cart which may be collapsed for storage and/or in transportation.

In the present day mode of living, with small apartments or houses in which there is a dearth of storage room, it has become increasingly necessary to use compact, convertible, and collapsible devices, so as to have one device do the work of several, and when not in use, to allow it to be collapsed into a small compact unit to easily fit into a small storage space. While it is primarily a wheeled collapsible unit that the present invention has embodied, the device may be used for many other purposes than as presently described.

The instant invention provides for easy assembly and sturdiness in construction of a shopping cart.

It is, therefore, an object of my invention to provide a square shopping cart of sturdy construction and wherein the cart may be shipped disassembled in a collapsed position to occupy a space of comparatively narrow volume.

Another object of my invention is to provide a collapsible cart wherein the assembly of components requires substantially no welded members.

Another object of my invention is to provide a collapsible cart that may be assembled at the manufacturing facility with a minimum of bolts and nuts and which may be shipped fully assembled in collapsed position.

Another object of my invention is to provide a collapsible square shopping cart of predominantly wire members of standard construction which may be fitted together by means of interlocking frame members.

Other objects of my invention are to provide an improved device of the character described, that is easily and economically produced, which is sturdy in construction, and which is highly efficient in operation.

With the above and related objects in view, my invention consists in the details of construction and combination of parts, as will be more fully understood from the following description when read in conjunction with the accompanying drawings, in which:

Fig. 1 is a perspective view of a square collapsible cart embodying my invention.

Fig. 2 is a front view thereof.

Fig. 3 is a fragmentary exploded view of the channel frame members prior to clamping about the rectangular rod members.

Fig. 4 is a fragmentary perspective view of the modification showing the channel frame members clamped about the rectangular rod members.

Fig. 5 is a fragmentary exploded view of the diagonal channel frame members prior to clamping about the rectangular rod members.

Fig. 6 is a fragmentary perspective view showing the disposition of the rear vertical channel frame members and the front diagonal channel frame members in clamped position about the rectangular rod members.

Fig. 7 is a sectional view taken along lines 7—7 of Fig. 6.

Fig. 8 is an exploded view of the modification shown in Fig. 4.

Referring now in greater detail to the drawings in which similar reference characters refer to similar parts, I show a collapsible cart comprising a frame, generally designated as A, a folding basket, generally designated as B, and a wheeled carriage, generally designated as C.

The frame A comprises a substantially U-shaped tubular member having a pair of legs 10 and 12 integrally extending from a closed bight portion 14. The bight portion 14 defines a handle for pushing the cart conveniently about. The lowermost portion of the legs 10 and 12 each have respectively a downwardly bent foot portion 16 and 18 which enable the cart to rest at four points upon the ground when in extended position.

The basket B comprises a plurality of rectangular rods 20 maintained in fixed spaced relationship with one another by a pair of rear vertical posts B1 and a pair of diagonal front posts B2. Each of the post members B1 and B2 comprises a pair of extruded channel elements 22 and 24 of identical cross section. Aligned spaced arcuate slots 25 are cut in the wing portions of the channel element 24. It is to be observed that the channel elements 22 and 24 interfit with one another wherein each of the arcuate slots 23 in the channel member 22 register with the slots 25 in channel 24. In Figs. 3, 5, 6 and 7 the channel members 22 and 24 are shown as being of identical cross section wherein the wing portions of each channel element interfit alternately with one another. A plurality of longitudinally spaced holes are formed or cut in each of the channel elements whereby the respective holes register with one another to enable securing of the two channel elements in abutting relationship by way of bolts 28 extending through complementary holes 26. It is to be observed that when the posts B1 and B2 are assembled from the complementary channel elements 22 and 24, the elements themselves fit about the rectangular rod members so as to not bind the rods but to support these rods pivotally about the axis of the rods. It is also to be noted that prior to assembly into the basket form B, each of the rods is formed into a rectangular configuration with the free ends thereof abutting and welded together. Attention is also invited to the fact that each of the wire rod members 20 is staked on either side of each of the posts B1 and B2 in order to prevent the posts from sliding laterally along the rods in view of the pivotal axial positioning of the rods 20 within each of the post slots.

The uppermost rectangular rod member has a pin 30 and 32 projecting outwardly from each side thereof and extending through apertures in the legs 10 and 12 respectively in the frame member A. The pins 30 and 32 are pivotally secured in the frame A whereby the entire basket B is integrated and pivotally secured upon the frame A.

The lowermost wire rod member 20 has a plurality of rods 34 welded thereto from the front to the back thereof and a plurality of rods 36 intersecting the rods 34 and welded thereto to define a reticulated bottom.

The carriage C comprises an axle 40 having wheels 42 pivotally mounted thereon at either end. The axle 40 itself is pivotally secured within an eyelet on each of the rods 34 in the reticulated bottom of the basket.

A sliding bracket generally designated as D extends outwardly from the sides of the reticulated bottom and has a looped eyelet thereon which encircles the legs 10 and 12 respectively of the frame A. The brackets D slideably engage the leg members 10 and 12 but restrict and limit further downward folding of the cart in extended position by abutting the intersection where the feet 16 adjoin the respective leg portions 10 and 12.

A step-on feature extends from the rear of the reticulated bottom (not shown), so that a person stepping upon the extension feature may raise the front of the bottom to elevate the entire basket B. A metal cap 48 is positioned about the upper portion of the posts B2 and engirdles the posts to define a hood for the top portion thereof for concealing any sharp edges and for providing means for imprinting a name thereon.

In Figs. 4 and 8, I show a modification of my invention wherein posts B3 comprise extruded channel elements 50 and 52 which are not of identical cross section but enables the post 50 to completely nest within the wings of the channel element 52.

Although my invention has been described in considerable detail, such description is intended as being illustrative rather than limiting, since the invention may be variously embodied, and the scope of the invention is to be determined as claimed.

I claim:

1. In a collapsible cart, an unfolding basket comprising a plurality of rods maintained in vertical spaced relationship from each other by a plurality of vertical posts spaced from each other, said vertical posts each comprising a pair of interfitting channel elements having a plurality of complementary slots to pivotally support said rods, a frame having legs extending to define feet, said basket being pivotally supported on said legs and a bracket secured to said basket and slidably engaging each of said legs to limit unfolding of said basket.

2. The invention of claim 1 wherein each of said rods includes a front portion and a rear portion, a first pair of said vertical posts pivotally supporting the front portions of said rods and a second pair of said vertical posts pivotally supporting the rear portions of said rods, said first pair of posts being angularly disposed with respect to each other, said second pair of posts being disposed from each other in parallel relationship.

3. The invention of claim 2 wherein said first pair of posts extend from a common point near the top of said basket.

4. In a collapsible cart, an unfolding basket comprising a plurality of rectangular rods each having a front portion and a rear portion, said rods being maintained in vertical spaced relationship from each other by a first and second pair of vertical posts spaced from each other, said vertical posts each comprising a pair of interfitting channel members having a plurality of complementary slots to pivotally support said rectangular rods, said first pair of posts pivotally supporting the front portions of said rods and said second pair of posts pivotally supporting the rear portions of said rods, a U-shaped frame having a bight portion to define a handle and legs extending therefrom, said basket being pivotally supported on said legs, said legs extending to define feet which are downwardly bent from said legs at the intersection of said legs and said feet and a bracket secured to said basket and slidably engaging each of said legs to limit unfolding of said basket by abutting said intersection of said feet and said legs.

References Cited in the file of this patent

UNITED STATES PATENTS

| | | |
|---|---|---|
| 449,007 | Spain | Mar. 24, 1891 |
| 494,141 | Harris | Mar. 28, 1893 |
| 1,104,970 | Dean | July 28, 1914 |
| 1,815,858 | Liftschultz | July 21, 1931 |
| 2,071,673 | Whitlock | Feb. 23, 1937 |
| 2,414,943 | Gray | Jan. 28, 1947 |
| 2,835,500 | Berlin | May 20, 1958 |

OTHER REFERENCES

Article in "Los Angeles Times," Sunday, March 4, 1956, part I, page 35.

Page 100 of "Housewares Review" Magazine for April 1956.